R. L. PIRSSON & J. S. OLIVER.
COUPLING FOR PIPES.
No. 187,982. Patented March 6, 1877.
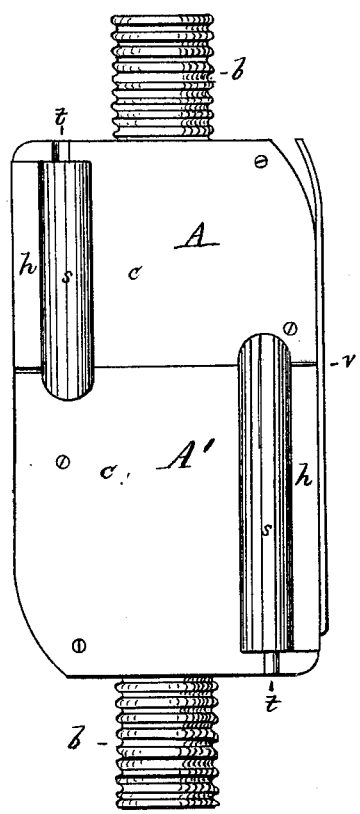
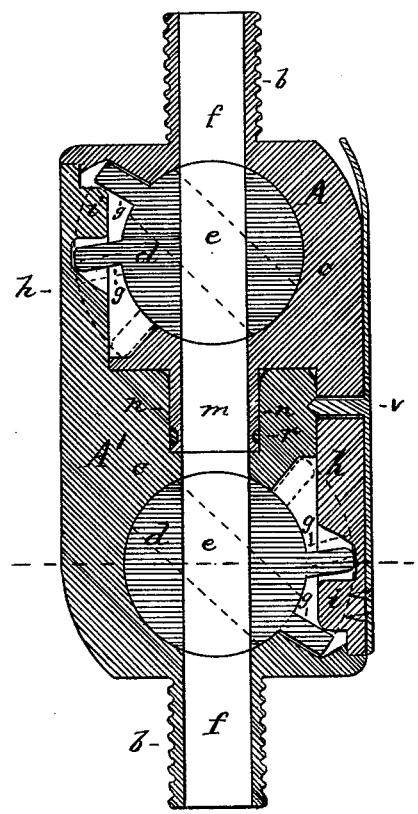
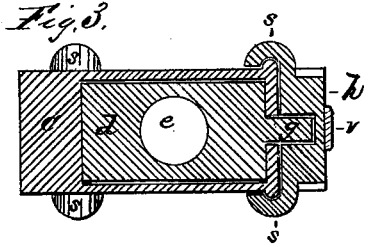
Witnesses
W. L. Bennett
W. H. Isaacs
Inventors
Robert Lainitz Pirsson
John Stewart Oliver
by their Att,
E. S. Renwick

UNITED STATES PATENT OFFICE.

ROBERT L. PIRSSON AND JOHN S. OLIVER, OF NEW YORK, N. Y.

IMPROVEMENT IN COUPLINGS FOR PIPES.

Specification forming part of Letters Patent No. 187,982, dated March 6, 1877; application filed January 2, 1877.

*To all whom it may concern:*

Be it known that we, ROBERT LAUNITZ PIRSSON and JOHN STEWART OLIVER, both of the city, county, and State of New York, have made an invention of certain new and useful Improvements in Couplings for Pipes; and that the following is a full, clear, and exact description and specification of the same.

This invention is applicable more particularly to the flexible pipes which are used with air-brakes for railroad-cars; and its object is to enable the air-pipes of consecutive cars to be readily disconnected, and at the same time to be closed, so as to prevent the passage of air into or out of the ends of the pipes at the place where the disconnection is made; also, to enable the ends of the said pipes to be readily connected, and at the same time to be opened at the place of connection, so that air may then pass through the coupling. The invention, however, may be used for every other purpose to which it is applicable.

According to our invention, the ends of the pipes which are to be connected or coupled together are each provided with an apparatus which we term a "coupling-valve," consisting of a valve and its appurtenances. These coupling-valves are so constructed that two of them may be connected together, forming what we term a "duplex pipe-coupling," and that the operation of making the connection of two coupling-valves opens the valve of each, while the operation of disconnecting the coupling-valves closes the valve of each.

The improvements consist of certain combinations of devices, of which the following are the principal, viz: A tubular valve-case having an ajutage, nozzle, or other device by means of which it can be secured to one of the pipes to be coupled; a valve fitted to said valve-case, and provided with teeth, pins, a stem, or other appurtenance, by means of which it may be moved to open and close the passage of the tubular valve-case; a valve-mover or device adapted to operate upon the teeth, pins, stem, or other appurtenance of the valve of the adjacent coupling-valve, when two coupling-valves are applied to each other, so that when the two are connected the valve-mover of one operating upon the valve of the other causes the latter to open, and when the two coupling-valves are disconnected the valve-mover of one operating upon the valve of the other causes the latter to close; one or more guides, by means of which the coupling-valves are held in proper positions relatively to each other; one or more fastening devices, for the purpose of holding the coupling-valves together when they have been connected. The fastening device preferred for this purpose is a spring catch or latch which will yield when the coupling-valves are pulled apart; but if the entire invention be not used, a screw or other fastening device may be employed, if deemed best.

The several combinations of the above devices which constitute the improvements are set forth in detail at the close of this specification. In order that they may be fully understood, we have represented in the accompanying drawing, and will proceed to describe, a duplex pipe-coupling embodying the invention in the best form thus far devised by us, it being understood that the form and construction of the devices embodied in the same may be changed as may be found expedient.

Figure 1 of the said drawing represents a side view of the duplex pipe-coupling, with its members or coupling-valves connected as they are when two pipes are coupled together. Fig. 2 represents a longitudinal section of the same. Fig. 3 represents a transverse section of the same.

The duplex pipe-coupling represented in the above drawings consists of two coupling-valves, A A', connected together. Each coupling-valve has a tubular valve-case, $c$, which is fitted with a nozzle, $b$, by means of which it may be secured to the end of the pipe to be coupled. The valve-case contains a valve, $d$, which, in this instance, has the form of a cylinder, arranged to turn upon its axis, and perforated transversely, to form a passage, $e$, the valve thus being of the cock variety. This valve is fitted at one side of its periphery with two teeth, $g\ g$, which protrude through a slot in one of the sides of the valve-case, and constitute the appurtenance to which the power is applied for the purpose of turning the valve, so as to open or close the tubular passage $f$ through the valve-case. The valve-case has at one side a projection, $h$, which extends from it in such a position as to operate upon the valve-teeth $g$ of the adjacent coupling-valve when the two coupling-valves are applied to each other. This projection is constructed with recesses, the partition $i$ between which constitutes a tooth, which can engage between the two teeth $g\ g$ of the valve of the adjacent coupling-valve, so as to move the same whenever the coupling-valves are pushed together or are drawn apart. These projections $i\ i$ thus constitute the valve-movers of the coupling-valves, represented in the drawings.

In order that the coupling-valves of each duplex pipe-coupling may be fitted to each other air-tight, one of the two is fitted with a projecting nozzle, $m$, and the other is formed with a socket, $n$, to receive the said nozzle. The joint between the nozzle of the nozzle-coupling valve and socket of the socket-coupling valve is packed, by preference, by means of a ring of india-rubber, $r$, inserted in a ring-groove of the nozzle $m$.

In order that the two coupling-valves may be readily applied to each other in the proper positions for the valve-mover of the one to operate upon the valve of the other, each coupling-valve is provided with a guide, composed, in this instance, of two grooved fillets, $s\ s$, which are constructed to slide upon guide-ledges $t\ t$, formed upon the valve-case of the other coupling-valve; and in order that the two coupling-valves may not separate accidentally a spring-catch, $v$, is fitted to one, so as to engage in a socket formed in the other. The nose of this catch is, by preference, made wedge-formed, so that it will move either to permit the fastening of the coupling-valves together, or their disconnection, when sufficient force is applied to them, without the necessity of applying the hand to the catch.

When the above-described duplex pipe-coupling is used to couple the pipes of air-brakes of either the vacuum or compression systems, one member or coupling-valve of the duplex pipe-coupling is secured to the ends of each pipe of a car, care being taken to so apply them that when the cars are to be coupled together the nozzle-coupling valve A of one duplex pipe-coupling and the socket-coupling valve A' thereof will, at the adjacent ends of the two pipes, be coupled, and that the valves of the several coupling-valves are left open.

When the pipes of two cars are to be coupled, the operator takes the two coupling-valves in his hands and applies them endwise to each other, with the guides $s\ s$ in the proper relative positions to the guide-ledges. He then forces the two coupling-valves together endwise, so that the nozzle $m$ of one enters the socket $n$ of the other, and makes a joint. As the two coupling-valves are forced endwise together, the valve-mover of one, operating upon the valve of the other, opens the same, so that when the coupling is completed, the passage through the duplex pipe-coupling from one pipe to the other is open, as seen in Fig. 2. When, on the other hand, the two coupling-valves are drawn apart, either by hand or by the accidental separation of the cars, the valve-mover of one, operating upon the valve of the other, effects the positive closing of the same, so that by the time the two coupling-valves are separated, the valve at the end of each pipe is closed, and the valve and valve-teeth occupy the positions represented in dotted lines in Fig. 2.

In practice, all the nozzle-coupling valves are duplicates of each other, and all the socket-coupling valves are also duplicates of each other, and each air-pipe of every car is fitted at one end with a nozzle-coupling valve, A, and at the other end with a socket-coupling valve, A', so that the pipe of any car may be connected with that of any other car.

We claim as our invention—

1. The combination, substantially as before set forth, of the valve-case, the valve, the appurtenance of the valve by which it may be moved, and the valve-mover adapted to close an adjacent coupling-valve.

2. The combination, substantially as before set forth, of the valve-case, the valve, the appurtenance of the valve by which it may be moved, the valve-mover adapted to close an adjacent coupling-valve, and the guide.

3. The combination, substantially as before set forth, of the valve-case, the valve, the appurtenance of the valve by which it may be moved, the valve-mover adapted to close an adjacent coupling-valve, and the nozzle by which said valve-case may be connected with another.

4. The combination, substantially as before set forth, of the valve-case, the valve, the appurtenance of the valve by which it may be moved, the valve-mover adapted to close an adjacent coupling-valve, and the socket to receive the nozzle of another valve-case.

5. The combination, substantially as before set forth, of the valve-case, the valve, the appurtenance of the valve by which it may be moved, the valve-mover adapted to close an adjacent coupling-valve, and the fastening device.

6. The combination, substantially as before set forth, of the turning-valve, the peripheral tooth by which it is moved, and the slotted valve-case, through the slot of which the said tooth projects.

Witness our hands this 28th day of December, A. D. 1876.

ROBERT LAUNITZ PIRSSON.
JOHN STEWART OLIVER.

Witnesses:
W. L. BENNEM,
W. H. ISAACS.